May 20, 1952  M. FRENKEL  2,597,091
HEAT EXCHANGER
Filed Aug. 27, 1947  3 Sheets-Sheet 1
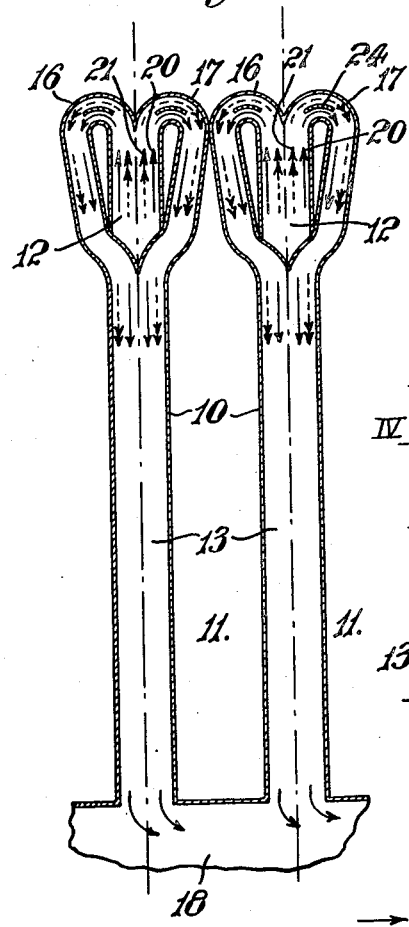
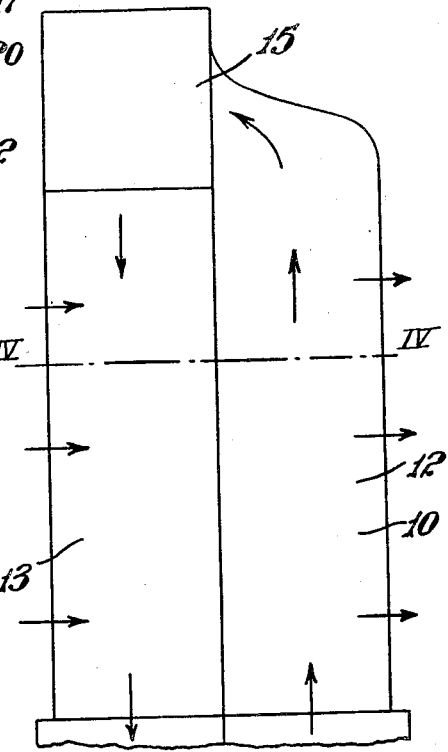
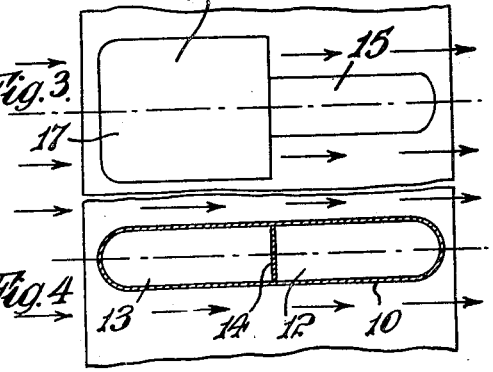
Inventor
Meyer Frenkel
By Morris Spector,
Attorney.

May 20, 1952     M. FRENKEL     2,597,091
HEAT EXCHANGER
Filed Aug. 27, 1947     3 Sheets-Sheet 2
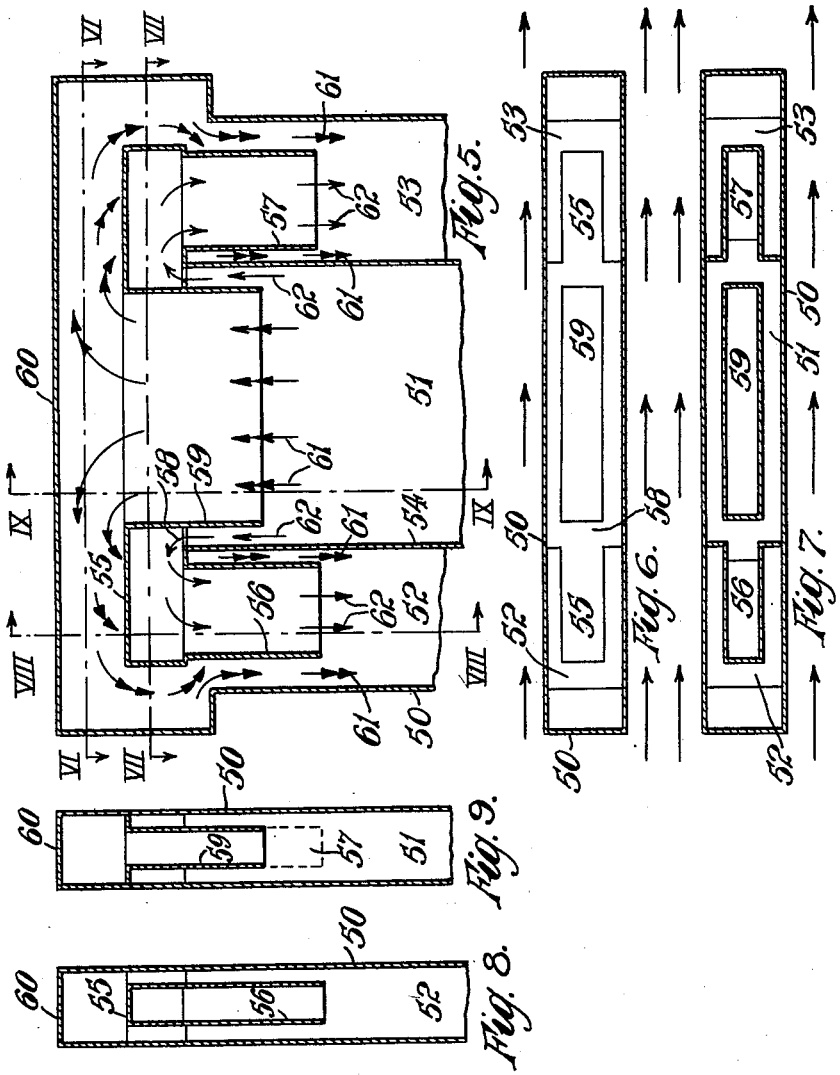
Inventor
Meyer Frenkel
By Morris Spector,
attorney.

May 20, 1952     M. FRENKEL     2,597,091
HEAT EXCHANGER

Filed Aug. 27, 1947     3 Sheets-Sheet 3

Patented May 20, 1952

2,597,091

UNITED STATES PATENT OFFICE 2,597,091

HEAT EXCHANGER

Meyer Frenkel, London, England

Application August 27, 1947, Serial No. 770,924
In Great Britain September 4, 1946

6 Claims. (Cl. 257—238)

This invention relates to heat exchangers.

More particularly the invention relates to heat exchange apparatus employing at least one flowing fluid (gaseous or liquid) from which heat is abstracted or to which heat is imparted.

The invention is applicable for example to all types of heat exchangers used in the chemical industry, to heat exchangers used for heating or refrigeration, to evaporators, condensers, radiators for internal combustion engines, oil coolers and other heaters or coolers for gaseous or liquid fluids.

The idea underlying the present invention is based on the following phenomena:

The heat exchange of a fluid flowing in a duct (e. g. in a tube) with the walls of the duct (the heat transferring walls), mainly takes place in the layers of the stream which are adjacent the heat transferring wall, while the layers of the fluid remote from the heat transferring wall, i. e. the inner layers of the stream, partake in the heat exchange only to a small degree.

As can be proved, even with large velocities of the fluid producing turbulent flow in the duct, the heat exchange in the duct itself due to the turbulence only will be such that although a certain mean temperature of the fluid will be achieved, there will still be large temperature differences between the layers of the fluid adjacent the heat transferring wall and those remote therefrom.

Moreover, in order to achieve transfer of a certain quantity of heat, large surface areas of heat transferring wall are required, for the following reasons:

Even with strongly turbulent flow, the vortices in a fluid develop mainly in a thin layer near the wall, and rapidly fall off towards the centre of the duct. Hence the mixing of particles mainly takes place near the heat transferring walls, and the velocity of flow falls steeply in a relatively thin layer near the wall of the passage, being large and evenly distributed in the interior of the flow cross-section.

Hence, due to the low velocity of the fluid near the wall, the volume of fluid flowing per unit period through that part of the cross-section near the wall where the heat exchange mainly takes place, is small, and this small volume remains near the heat transferring wall for a relatively long time, experiencing a much greater temperature change than that to the required mean exit temperature. Hence the temperature difference through the wall between the fluids partaking in the heat exchange falls very quickly, which greatly reduces the mean rate of heat transfer per unit area of heat transferring wall taken over the length of duct. Also, these layers in which turbulence mainly takes place (i e. the boundary layer and adjacent layers) form a heat insulating layer between the heat transferring wall and the inner layers of the flow, in which the turbulence has fallen off and where thus the mixing among particles is very small, and this further reduces the over-all rate of heat transfer per unit area of heat transferring wall per unit volume of flowing fluid, quite apart from the mean rate of heat transfer per unit area of heat transferring wall being small, due to the rapid drop of the temperature difference through the wall in the flow-direction.

As regards the contribution to the heat exchange of the mixing among particles due to the turbulence, the following is seen:

1. A large part of the fluid flowing per unit period, viz. the inner layers moving with greater speed, take comparatively little part in the heat exchange, as the turbulence falls off rapidly with increasing distance from the heat transferring wall to the centre of the flow, and the heat transfer between these inner layers and the heat transferring walls is impeded by the boundary layer and turbulent layers of the fluid near the wall forming a heat insulating layer between them.

2. In those layers near the wall, in which turbulence is set up, there are the following three kinds of mixing between particles:

Firstly, mixing of particles which have already taken part in the heat exchange among themselves, which is of no assistance for the heat exchange;

Secondly, mixing of particles which have not yet taken part in the heat exchange among themselves, which also does not assist the heat exchange; and Thirdly, mixing to only a small extent, of particles which have already taken part in the heat exchange with particles which have not yet taken part in the heat exchange, which is the only kind of mixing useful for the heat exchange.

Thus, due to this turbulence in a duct with no other provisions, a large part of the fluid, viz. the inner layers flowing with greater velocity, practically undergo no mixing at all, while in that part of the fluid mainly subject to mixing there is mixing of particles which have taken part in the heat exchange among themselves, mixing of particles which have not yet taken part in the heat exchange among themselves, and only to a small extent mixing of particles which have already taken part in the heat exchange with those that have not yet taken part in the heat exchange, which latter is the only kind of mixing useful for the heat exchange.

The foregoing thus demonstrates that for tubes with turbulent flow only, transfer of a certain quantity of heat to or from a fluid, in order to bring it to a required mean temperature, is only achieved at the expense of disproportionately large surface areas of heat transferring wall and disproportionately large pressure losses due to turbulence, while the temperature distribution of the fluid leaving a tube is still very uneven.

One object of the present is to provide apparatus in a heat exchanger duct of any cross-sectional shape which enables a required temperature change to be achieved substantially equally for all layers of the flowing fluid while keeping the temperature difference between layers of fluid adjacent the wall at any position along the duct and the wall itself high substantially along the length of a duct, so that a high rate of heat transfer per unit area of heat transferring wall per unit volume of fluid flowing per unit period is maintained substantially along the length of a duct.

Another object of the invention is to achieve transfer of a certain quantity of heat to or from a fluid in such a manner that the temperature of all layers on leaving the duct is substantially equal to the mean temperature required with relatively small areas of heat transferring walls.

A further object of this invention is to achieve the efficient heat interchange without unnecessary pressure losses in turbulence.

Other objects and advantages of the invention will become apparent as the description thereof proceeds.

In order to achieve the foregoing objects, the present invention provides for means for ensuring that each layer of a cross-section of a medium flowing in a duct, however small the thickness thereof required for effective heat exchange may be in any set of circumstances, is brought one after the other into contact with a section of the heat transferring wall only for such time as is required for it to take part efficiently in the heat exchange, each layer taking part in the heat exchange evenly throughout its surface, so that thereby consecutive sections of the heat transferring wall along the direction of flow of the fluid come into contact with layers which respectively have not yet been in contact with the heat transferring wall (e. g. for a case of cooling the starting temperature of a fresh layer is higher than the leaving temperature of the previous layer), thus substantially keeping up the temperature of the heat transferring wall on the side of the fluid in question along the length of the wall. This serves to maintain the temperature difference between the fluids at either side of the heat transferring wall, thus much increasing the average rate of heat transfer per unit area of heat transferring wall per unit volume of fluid flowing, while all layers emerge from the duct with substantially the required temperatures.

Moreover the bringing to the heat transferring wall of a duct of fresh layers from the interior of the stream at different positions along the duct, further contributes to the maintenance of the temperature difference in the following manner:

Each layer brought to the heat transferring wall from the interior of the stream has an initial velocity which is many times greater than that of the layer which has been removed from the wall, and this velocity only becomes reduced to its small value for the steady state in a "stabilising distance," which for laminar flow is from 60 to 80 times the tube diameter, and for turbulent flow is between 20 and 30 times the tube diameter.

In this "stabilising distance," where due to the greater velocity of the layers near the heat transferring wall greater masses per unit period flow in the immediate proximity of this wall, the quantity of heat per unit period which, due to the existing temperature difference, can pass through a unit area of heat transferring wall is provided by this greater mass of fluid flowing per unit period immediately adjacent the heat transferring wall, so that the temperature of this mass of fluid flowing changes less quickly than would the temperature of a smaller mass flowing immediately adjacent the wall, due to a smaller velocity of layers.

In effecting such "layer transposal," it is essential that a layer flowing originally along the heat transferring wall adjacent to it should be diverted therefrom simultaneously along the entire length of a line, which extends the entire width of said heat transferring wall (substantially the entire periphery of a flow cross-section), without preferred positions, so as not to cause stoppages or reductions in the velocity of this layer at any position, which reductions or stoppages would extend far back against the flow direction along the heat transferring wall, putting considerable areas of heat transferring wall substantially out of action.

In order to carry out the above objects and effects, this invention provides:

In a heat exchanger comprising at least one heat transferring wall for a fluid flowing along the length thereof, a flow layer transposing device comprising a "first" guide-wall extending from said heat transferring wall, which first guide-wall begins to extend from said heat transferring wall at substantially the entire length of a line common to the said two walls and extending over the entire width of said heat transferring wall, and ends remote from any heat transferring wall to one side only of the flow-section, which is bounded by a line enclosing the whole of the flow of said fluid through said layer transposing device and containing the whole of said line at which said first guide-wall begins to extend from said heat transferring wall, where said flow section is the smallest one passing through said boundary-line, the said layer transposing device further comprising a "second" guide-wall, which starts from a position remote from said heat transferring wall in the flow of said fluid and extends towards a heat transferring wall outside the space occupied by said layer transposing device for fluid leaving said device, said first guide-wall, due to its construction, diverting a layer of fluid originally flowing adjacent the heat transferring wall from substantially the entire width of said heat transferring wall to flow remote from a heat transferring wall for fluid leaving said layer transposing device, and said second guide-wall, due to its construction, guiding a layer of fluid originally flowing remote from said heat transferring wall to flow adjacent the heat transferring wall for fluid leaving said layer transposing device.

The invention will now be described by way of example and in some detail with reference to the accompanying drawings, in which:

Figs. 1, 2, 3, and 4 are respectively a longitudinal section, a side view, a top plan view and a section along the line IV—IV of Fig. 2, illustrating a first embodiment;

Fig. 5 is a diagrammatic section of a second embodiment;

Fig. 6 is a transverse section along the line VI—VI of Fig. 5;

Fig. 7 is a transverse section along the line VII—VII of Fig. 5;

Figs. 8 and 9 are sections along the lines VIII—VIII and IX—IX respectively of Fig. 5;

Figure 10:
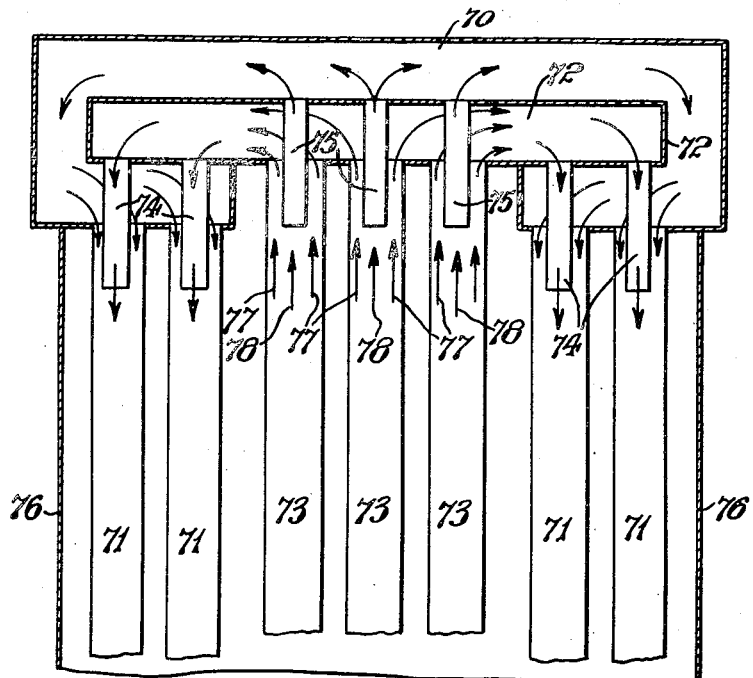
Fig. 10 is a diagrammatic section through a third embodiment.

The embodiments of this invention to be described and illustrated by way of examples in the following with reference to Figs. 1 to 10, may be termed "layer transposing appliances" and effect, at a position along a heat exchanger duct where the layers of the flow adjacent the heat transferring wall are calculated to have taken their part in the heat exchange required for maximum efficiency, that said layers are transposed to the centre of the flow in a continuation of the duct, while the former layers of the flow remote from said wall are now transposed adjacent to said heat transferring walls.

In the embodiment shown in Figs. 1 to 4, 10 denotes the walls of a plate type cross-flow heat exchanger, having spaces 11 traversed by a coolant. Each pair of walls 10 is closed at each end and provided with a partition 14 dividing the space bounded by said walls into two ducts 12 and 13, the fluid to be cooled flowing upwardly in the space 12 and downwardly in the space 13.

At the top of each element formed by the walls 10 is a layer transposing appliance comprising a duct 15, leading the fluid from space 12, which is divided into two branches 16 and 17 of substantially equal dimensions, which loop over in opposite directions and ultimately reunite in space 13. The two inner walls of said branch-passages form the first guide-wall, which begins to extend from the heat transferring wall at the top of passage 12 at substantially the entire periphery of the flow-cross-section and which, after each half of it has described a loop and the two have joined in the middle, ends remote from any heat transferring wall to one side only—going along the fluid flow—of the flow-cross-section from the periphery of which it began. The two outer walls of said branch-passages, starting remote from the heat transferring wall in the flow of the fluid, i. e. in the centre of the passage, after respectively looping over and joining the heat transferring wall of passage 13, form the second guide-wall.

Separate vanes 24 in the branch-passages 16 and 17 prevent intermixing of the layers, in this example.

The apparatus operates as follows:

Fluid to be cooled enters from header tank 18 into space 12 and flows up said space, having heat exchange through wall 10 with the other fluid flowing in cross-flow through space 11. The layers of fluid on the heat exchanging walls, denoted by the single headed arrows 20, take the maximum part in the heat exchange in this duct 12, while the inner layers of the flow, denoted by double headed arrows 21 take relatively very little part in the heat exchange. On entering the duct 15 and the branch-passages 16 and 17, said layers are however transposed, the former inner layers of the flow which have taken little part in the heat exchange and denoted by the double headed arrows 21, now coming adjacent to the heat transferring walls, while the former outer layers of the flow, which had taken their part in the heat exchange, now form the inner layers of the flow in the duct 13.

By virtue of the layer transposing appliance, the temperature of the layer coming into contact with the heat transferring wall 10 at the entrance to duct 13 will again be nearly the original temperature of the fluid to be cooled, so that the mean temperature difference along the length of duct is maintained and the rate of heat transfer per unit area of heat transferring wall substantially improved.

A particular advantage of this construction is that due to the temperature along the heat transferring wall having their peak values at opposite ends of the unit, the mean temperature of the walls taken in the direction of the flow of the second fluid over the two ducts of an element (across the flow of the fluid to be cooled) is practically constant at all levels, being substantially the mean of the entry and exit temperatures of the fluid to be cooled. Thus, practically as much heat is given up by duct 13 as by duct 12, all layers of the second fluid taking up the same heat.

The embodiments hereinbefore described have been of "layer transposing devices" more suitable for use with ducts of elongated cross-sectional shapes. The embodiments hereinafter described are adapted to be used in ducts of any cross-sectional shape, including ducts of elongated cross-sectional shape, but also tubes of circular cross-section.

The embodiments to be described with reference to Figs. 5 to 10 effect, that at a position along the heat exchanger duct (tube) where the outer layers of the flow are calculated to have taken their required part in the heat exchange, said outer layers are separated from the inner layers of the flow by the insertion of tube-stump of smaller cross-sectional area, but substantially similar cross-sectional shape as the duct, thus forming branch passages, and where by separation and renewed interpenetration of the branch passages carrying respectively the outer layers of the flow and inner layers of the flow in the former passage, new ducts are formed in which the former outer layers of the flow are the innermost layers of the flow, while former inner layers of the stream flow adjacent the heat transferring walls, taking maximum part in the heat exchange.

By repeated application of such layer transposing appliances, a desired number of layers of a flow-cross-section (however small their thickness for effective heat exchange may be in any set of circumstances), can be brought one after another into contact with successive sections of the heat transferring wall in the direction of flow.

Figs. 5 to 9 show a plate type heat exchanger comprising a series of closed compartments bounded by heat transferring walls 50. Each compartment is divided into three adjacent ducts 51, 52, 53, by partition 54 and adjacent ends of said ducts are covered by a return bend or continuation piece 60, which connects to the heat transferring walls 50. The heat exchange fluid enters through the duct 51 and passing down through ducts 52 and 53.

At the upper end of duct 51 is a rectangular tube stump 59 around which is disposed a separating wall forming a second internal return bend 55 from which depend two rectangular tube stumps 56 and 57. An opening 58 is left between the outer periphery of the tube stump 59 and the partition 54 for the outer layer of the fluid in duct 51, separated from the inner ones by tube stump 59, to flow into the second internal return bend 55.

The "first" guide-wall here starts from the heat transferring wall of passage 51 along the entire periphery of the end flow-cross-section of this passage, forms tank 55, and ends in tube-stumps 56 and 57 remote from the heat transferring wall to one side only—going along the flow—of its starting cross-section. The second guide-wall begins from tube-stump 59, remote from any heat transferring wall in the flow of the fluid in passage 51, passes through tank 55 and then forms the tank 60 extending towards, and joining, the heat transferring walls of continuation passages 52 and 53. The closed compartments can be arranged in rows next to one another to form the elements of a cross-flow heat exchanger, see the direction of flow of the second fluid taking part in the heat exchange indicated on the plan-sections Figs. 6 and 7.

The appliance operates as follows:

A fluid to be cooled, for example, flows up duct 51, and at a position where the outer layers denoted by single-headed arrows 62 are calculated to have taken their required part in the heat exchange, they are separated from the inner layers denoted by double-headed arrows 61 by the suitably dimensioned tube-stump 59. The outer layers of the stream flow into internal return bend 55, while the inner layers of the flow, having taken relatively little part in the heat exchange, flow into outer return bend 60. From internal return bend 55 the former outer layers of the flow, which have taken their part in the heat exchange, denoted by single-headed arrows 62 are introduced as innermost layers of the flow into the return ducts 52, 53 through the tube stumps 56, 57, while the former inner layers of the flow 61, from outer return bend 60 flow round the outside of the interior return bend 55 into ducts 52 and 53 to form the outer layers of the flow in these ducts, taking maximum part in the heat exchange.

Fig. 10 shows the layer transposition of the present invention in application to tubes of circular cross-section in a shell-and-tube-type heat exchanger.

The appliance is installed in place of the ordinary header tank, and comprises a first return bend or continuation piece 60, from which depends tube bundle 71. Said return bend 70 houses separating wall forming a second internal return bend 72, from which depends externally tube bundle 73. Also depending from inner return bend 72 and communicating therewith are bundles of tube stumps 74, entering into the tubes 71. Carried by, but not communicating with the second return bend 72 are bundles of tube stumps 75 which project internally of said second return bend 72 and into the tubes 73, and communicate directly with outer return bend 70. The tube bundles are surrounded by shell 76 having an inlet and an outlet (not shown), in which flows the other fluid taking part in the heat exchange. Similarly as described for the previous example, tank 72 and tube-stumps 74 form the "first" guide-wall, starting from the heat transferring walls of tubes 73 at the entire peripheries of their respective end flow-cross-sections, forming tank 72 and ending in tube-stumps 74, remote from the heat transferring walls of tubes 71 to one side only—going along the flow—of its starting cross-section. The second guide-walls start remote from the heat transferring wall of tubes 73 in the flow of fluid, in tubes stumps 75, extend through tank 72, and form tank 70, which extends towards, and joins the heat transferring walls of tubes 71.

The appliance operates as follows:

In the tubes 73 the outer layers of the flow, which have taken their required part in the heat exchange, and which are denoted by double-headed arrows 77, are separated from the inner layers of the flow by suitably dimensioned tube stumps 75, leading the inner layers denoted by arrows 78 of the whole tube bundle into return bend 70, while all the outer layers of the bundle flow into the second return bend 72. From this inner return bend 72 the former outer layers are introduced into the interior of the streams in the return tubes 71 by means of the tube stumps 74, while the former inner layers of the stream, denoted by double-headed arrows 77, flow round inner return bend 72 from all sides and enter the tubes of bundle 71 as outer layers of the flow, taking their part in the heat exchange.

Thus, by means of this layer transposing appliance of simple construction, which can be applied to shell-and-tube heat exchangers of otherwise orthodox arrangement in place of the present header tanks, the mean temperature difference through the heat transferring walls between the two fluids taking part in the heat exchange, taken over the combined lengths of tubes 73 and 71, is kept much higher than it would be with an ordinary header tank returning the flow, so that the rate of heat transfer per unit area of heat transferring wall per unit volume of fluid flowing will be considerably increased, leading to a considerable saving in area of heat transferring wall for a required performance while producing substantially even temperature distribution in the emerging flow. The keeping up of the temperature difference is further contributed to by the fact that in the return tubes 71 the new outer layers of the flow enter the tube with a much greater velocity than they will have when a steady velocity distribution in the tube is reached, as the inner layers of the flow in the former tubes move much more quickly, and thus, during the "stabilizing distance" of the flow, the heat transferred per unit area of heat transferring wall per unit period produces a smaller temperature drop in the faster-moving layer on the heat transferring wall than it would do from a slowly moving one when the steady velocity distribution has been reached.

This same factor, as also, for a case of cooling, the maintenance of the mean wall temperature, will also contribute to keeping the mean thickness of stagnant boundary layer, which acts as heat insulation, much smaller than in an orthodox heat exchanger tube.

In a modification of the example just now described, that part of the fluid which had already taken part in the heat exchange in tubes 73, viz. the outer layers in those tubes, which flow into tank 72, may be led from this tank straight out of the heat exchanger, the tube-stumps 74 then not being required. The layers flowing in the interior of tubes 73 will then flow from tank 70 into tubes 71, which may be of reduced diameter.

The embodiment of this invention just described is also applicable to heat exchanger ducts of any desired cross-sectional shape.

It will be understood that the embodiments of my invention described in the foregoing are by way of example only, and that many other examples and modifications of the invention are possible within the scope of the appended claims.

I claim:

1. In heat transfer apparatus comprising a first and a second duct arranged adjacent to one another, each duct having a heat transferring wall, and a first return bend covering the adjacent ends of said ducts, a second return bend arranged within said first return bend, said second return bend communicating with the end of said first duct, a first tube-stump mounted in and penetrating through the wall of said second return bend, said first tube-stump extending internally of said second return bend, mouthing substantially centrally into said first duct and being spaced from the wall of said first duct, and a second tube-stump, said second tube-stump being mounted on and extending externally of said second return bend, and said second tube-stump mouthing into said second duct and being spaced from said wall of said second duct, whereby when in operation with a fluid flowing through said ducts, the outer and inner layers of said fluid in said one duct are guided to flow mutually transposed in said second duct.

2. In heat transfer apparatus comprising a first and a second duct arranged adjacent to one another, each duct having a heat transferring wall, and a first return bend covering the adjacent ends of said ducts, a second return bend arranged within said first return bend, said second return bend communicating with the end of said first duct, a first tube-stump mounted in and penetrating the wall of said second return bend, said first tube-stump extending internally of said second return bend and ending adjacent the end-cross-section of said first duct, said first tube-stump being at least at said end coaxial with said first duct and spaced from said heat transferring wall of said first duct, and said first tube-stump having at least said end-cross-section similar to but smaller than the end-cross-section of said first duct, and a second tube-stump mounted on and extending externally of said second return bend and ending adjacent the end-cross-section of said second duct, said second tube-stump being at least at said end coaxial with said second duct and spaced from said heat transferring wall thereof, and having at least said end-cross-section similar to but smaller than the end cross-section of said second duct, whereby when in operation with a heat exchange fluid flowing through said ducts, the outer and inner layers of said fluid in one of said ducts are guided to flow mutually transposed in said other duct.

3. In heat transfer apparatus comprising a plurality of first ducts and a plurality of second ducts arranged adjacent to one another, each duct having a heat transferring wall, and a first return bend covering the adjacent ends of said ducts, a second return bend arranged in said first return bend, said second return bend communicating with said ends of said first ducts, a plurality of first tube-stumps mounted in and penetrating through the wall of said second return bend, said first tube-stumps each extending internally of said second return bend and ending adjacent the end-cross-section of one of said first ducts, said first tube-stumps being each at least at said end coaxial with said first duct and spaced from said heat transferring wall thereof, and said first tube-stumps each having at least said end-cross-section similar to but smaller than the end-cross-section of said first duct, and a plurality of second tube-stumps mounted on said second return bend, said second tube-stumps each extending externally of said second return bend and each ending adjacent the end-cross-section of one of said second ducts, said second tube-stumps being each at least at said end coaxial with said second duct and having at least said end-cross-section similar to but smaller than the end-cross-section of said second duct, whereby when in operation with a heat exchange fluid flowing through said first and second ducts the outer and inner layers of said fluid in said first ducts are guided to flow mutually transposed in said second ducts.

4. In a heat exchanger comprising a plurality of first tubes and a plurality of second tubes forming a bundle, at least one tube-plate at each end of said bundle, a shell surrounding said bundle and forming with said tube-plates a closed space traversed by said tubes, an inlet and an outlet for said space, and a first return bend at one end of said bundle covering the adjacent ends of said first and second tubes, a second return bend arranged within said first return bend, said second return bend communicating with the ends of said first tubes, a plurality of first tube-stumps mounted in and penetrating the wall of said second return bend, said first tube-stumps each extending internally of said second return bend and mouthing into one of said first tubes, each of said first tube-stumps being mounted concentrically with said first tube and being spaced from the wall thereof, and a plurality of second tube-stumps mounted in the wall of said return bend, each of said second tube-stumps extending externally of said return bend and mouthing into one of said second tubes, each of said second tube-stumps being mounted concentrically with said second tube and being spaced from the wall thereof, whereby when in operation with heat exchange taking place between a first fluid flowing through said first and second tubes and a second fluid flowing through said shell about said tubes, the outer and inner layers of said first fluid in said first tubes are guided to flow mutually transposed in said second tubes.

5. In heat transfer apparatus comprising a first and a second duct arranged adjacent to one another, each duct having a heat transferring wall, and a return bend connecting adjacent ends of said ducts, a separating wall in said return bend forming, at least in part, an interior space therein which communicates with the end of said first duct, a first tube-stump mounted in and penetrating through said separating wall, said first tube-stump extending internally of said space, mouthing into said first duct and being spaced from said wall of said first duct, and a second tube-stump mounted in and penetrating through said separating wall, said second tube-stump extending externally of said space, mouthing into said second duct and being spaced from said wall of said second duct, whereby when in operation with a heat exchange fluid flowing through said ducts, the outer and inner layers of said fluid in said first duct are guided to flow mutually transposed in said second duct.

6. In heat transfer apparatus comprising a first and a second duct, each duct having a heat transferring wall, and a continuation piece connecting adjacent ends of said ducts, a separating wall in said continuation piece forming, at least in part, an interior space therein which communicates with the end of said first duct, a first tube-stump mounted in and penetrating through said separating wall, said first tube-stump extending internally of said space, mouthing into said first duct and being spaced from said wall of said first duct, and a second tube-stump mounted in and penetrating through said separating wall, said second tube-stump extending externally of said space, mouthing into said second duct and being spaced from said wall of said duct, whereby when in operation with a fluid flowing through said ducts, the outer and inner layer of said fluid in said first duct are guided to flow mutually transposed in said second duct.

MEYER FRENKEL.

REFERENCES CITED

The following references are of record in the file of this patent:

UNITED STATES PATENTS

| Number | Name | Date |
|---|---|---|
| 646,378 | Szamatolski | Mar. 27, 1900 |
| 830,423 | Fernwell | Sept. 4, 1906 |
| 911,829 | Mauvernay | Feb. 9, 1909 |